Oct. 16, 1934.      C. D. PETERSON      1,977,204
SLIDING GEAR TRANSMISSION (INTERRUPTED GEAR TOOTH)
Filed May 12, 1932
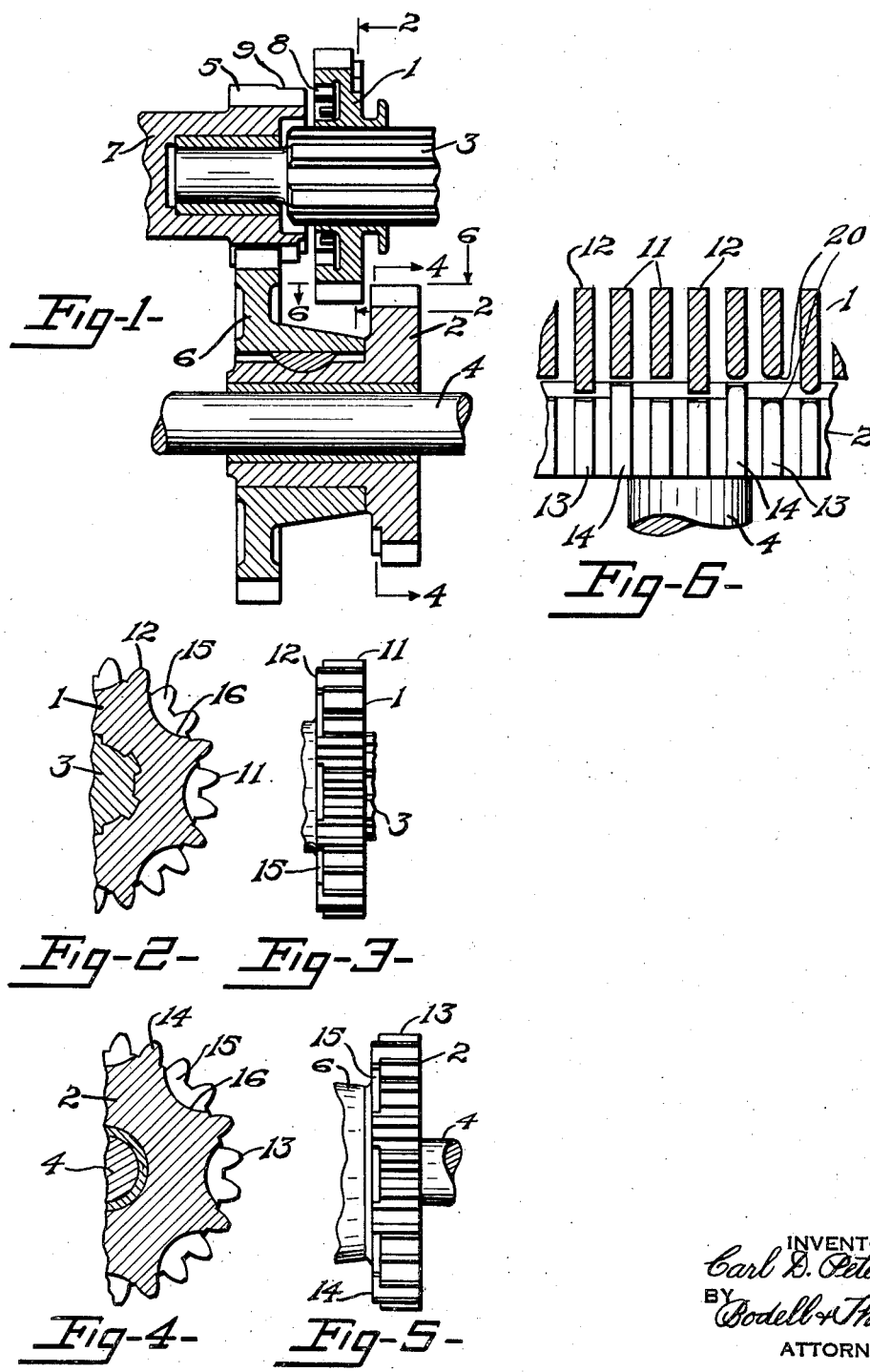
INVENTOR
Carl D. Peterson
BY Bodell+Thompson
ATTORNEYS Patented Oct. 16, 1934

1,977,204

UNITED STATES PATENT OFFICE 1,977,204

SLIDING GEAR TRANSMISSION (INTERRUPTED GEAR TOOTH)

Carl D. Peterson, Toledo, Ohio, assignor to Spicer Manufacturing Corporation, Toledo, Ohio, a corporation of Virginia Application May 12, 1932, Serial No. 610,891

1 Claim. (Cl. 74—339)

This invention relates to change speed transmission gearing embodying external sliding gears, and has for its object a gear tooth arrangement and construction, whereby the gears can be brought into mesh more easily than in conventional sliding gear transmissions and with the tendency of the gears to clash greatly reduced.

The invention consists in the novel features and in the combinations and constructions hereinafter set forth and claimed.

In describing this invention, reference is had to the accompanying drawing in which like characters designate corresponding parts in all the views.

Figure 1 is a fragmentary, sectional view of a portion of a transmission gearing having gears embodying this invention.

Figure 2 is a sectional view on line 2—2, Figure 1.

Figure 3 is an edge view of the gear shown in Figure 2.

Figure 4 is a sectional view on line 4—4, Figure 1.

Figure 5 is an edge view of the gear shown in Figure 4.

Figure 6 is a development view of the periphery of one of the gears showing the operation of the teeth of the gears when they are being brought into mesh, this view being taken approximately on the plane of line 6—6, Figure 1, but with the gear teeth shown as located in a plane.

This invention comprises a pair of coacting gears, one of which is slidable into and out of mesh with the other, each of the gears having some of its teeth cut back or shorter from end to end than the others, the shorter teeth occurring at regular intervals, and the number of shorter teeth that are grouped together being dependent upon the difference in pitch line velocity of the gears when out of mesh and running at the same speed.

For example, in a pair of gears that have or will have different pitch line velocities when out of mesh, or a pair of gears of different diameters so that they have different pitch line velocities when running at the same speed, are to be brought into mesh at any one of various speeds, instead of synchronizing the gears before bringing them into mesh so that the pitch line velocities are the same when being brought into mesh, a relatively large angle for the initial engagement is required and more teeth must be set back than if the gears were synchronized or nearly synchronized just prior to meshing. In any one pair of gears because of the relative diameters of the gears being more nearly equal the ratio may be such that the gears would need every other tooth shorter or set back and another pair of gears where the difference in diameters is greater would require two or more teeth set back between two of the longer teeth. Hence, the underlying thought is setting back the required number of teeth for the longer teeth of one gear to come between the longer teeth of the other gear and then when these longer teeth engage by one catching up with the other, the long and short teeth of one gear are alined with the tooth spaces of the other gear so that the gears can be brought into mesh without clashing. The distance selected between any two longer teeth or the angle selected, of engagement, that is, the angle formed by the radial lines of any two long teeth is dependent upon the differences in the pitch line velocities of the gears when running out of mesh at the same speed. It is unnecessary to use synchronizing devices in shifting gears, or to speed up a driving gear relatively to a driven gear with which it is to be brought into mesh prior to bringing them into mesh, as when shifting from a high gear into a lower gear. Also the reverse is true, it is unnecessary to let a driven gear slow down by a vehicle losing momentum when a shift is to be made from a high gear to a lower gear. Hence, a shift can be made by an unskilled operator with no gear clashing, except in case the long teeth momentarily clash, by merely moving the gear shifting lever while the main clutch is thrown out. No synchronizing devices are necessary and no skill is required by the operator in synchronizing the gears by accelerating or decelerating.

1 and 2 designate respectively, the coacting gears. The gear 1 is mounted on a shaft 3, which is the transmission shaft of a conventional sliding gear transmission gearing.

4 is the countershaft on which the other gear is mounted. The gear 1 is slidable axially into and out of mesh with the gear 2 in the usual manner.

5 and 6 are intermeshing gears mounted respectively on the drive shaft 7 of the transmission gearing and on the countershaft 4 for driving the countershaft. The gear 5 and drive shaft 7 are usually formed integral, or together, from a stem gear.

The sliding gear 1 is shiftable in one direction from neutral to engage a gear clutch face 8 formed therein, with a complementary gear clutch face 9 on the gear 6 to clutch the shafts 7 and 3 directly together to produce high speed.

The gear 1 is shiftable in the opposite direction from neutral to intermesh with the gear 2.

The means for securing easy engagement of the gears to be brought into mesh, or effecting the intermeshing of the gears 1 and 2 without clashing comprises the shorter teeth on each of them arranged in regular order between longer teeth, so that when the shiftable gear 1 is shifted, the longer teeth of each gear will lap, or move partly into mesh with the other gear, due to the shorter teeth, and then upon relative rotation the longer teeth of one gear will engage the side face of one end of the next longer tooth of the other gear, thus alining the teeth of the gears for final engagement in case they do not move completely into mesh upon first engagement of the gears, or before the longer teeth of the gears engage.

In the event the longer teeth of the gears clash, or abut, against each other at their ends, the relative rotation of the gears will immediately bring them out of abutting relation, so that owing to the shorter teeth the longer teeth of the gears will lap each other. The number of teeth set back depends, as before pointed out, on the resultant pitch line velocity of the pairs of gears. The amount of set-back of the short teeth varies in different gears, for instance, if the resultant pitch line velocity of a pair of gears is high the teeth need not be set back as far as a pair of gears with low pitch line velocity, as the time element for engagement of gears with the relatively high pitch line velocity is less than for a pair of gears with a low pitch line velocity. The higher the velocity, the less time element for engagement, and consequently, the less distance the shorter teeth are set back for a quicker engagement of the teeth. To facilitate a short engagement, the teeth may be rounded, as shown at 20, Figure 6.

11 designates the shorter teeth of the gear 1, and 12 the longer teeth.

13 designates the shorter teeth of the gear 2, and 14 the longer teeth. The gears are first formed with all the teeth the same length, and then the shorter teeth are provided by milling off the ends thereof leaving a recess as 15 formed in the gear body at the ends of the teeth, the recess having an arc-shaped bottom 16. It is obvious that, as the sliding gear is brought toward the fixed gear 2, the longer teeth 12 will enter the recess 15 of the gear 2 and also, the longer teeth 14 of each of the gears will enter the recesses of the other gear at some point between the longer teeth 12, or the ends of the longer teeth will lap, and then upon relative rotation, the side faces of the end portions of the longer teeth will come against each other, thus alining the teeth of both gears for full intermeshing upon additional sliding movement of the gear 1. As before stated, in case the longer teeth 12 and 14 of the gears clash or abut, they will immediately go out of alinement because of relative rotation of the gears permitting the longer teeth of each gear to enter the recess of the other gear.

Owing to this arrangement of gear teeth, a wide entrance is provided for the gear teeth for the initial engagement thereof, so that the gears are brought into mesh without undue clashing without providing synchronizing parts in addition to the teeth of the gears, so that neither the gear bodies are increased in width nor the gear teeth themselves extended in length to provide synchronizing means.

What I claim is:

A pair of intermeshing gears for transmission gearing, one of which is slidable axially into and out of mesh with the other, each of the gears having some of its teeth which are opposed to the other gear set back, the set back teeth occurring in regular order between longer teeth whereby they are in regular alternating relation with the longer teeth, the number of shorter teeth between the longer teeth dependent upon the difference in the pitch line velocity of the gears of the pair when running out of mesh at the same speed, the greater the difference the greater number of teeth set back whereby a sufficient angle of engagement is provided between the longer teeth to permit the ends of the longer teeth of one gear to come between the longer teeth of the other gear at all relative speeds of the gears during gear shifting operations.

CARL D. PETERSON.